(12) United States Patent
Johnson et al.

(10) Patent No.: US 7,073,757 B2
(45) Date of Patent: Jul. 11, 2006

(54) ADJUSTABLE BRACKET FOR SECURING AN ELECTRICAL BOX TO A STUD

(75) Inventors: Steven J. Johnson, Galien, MI (US); Robert W. Jorgensen, Niles, MI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 10/731,406

(22) Filed: Dec. 10, 2003

(65) Prior Publication Data
US 2005/0127256 A1 Jun. 16, 2005

(51) Int. Cl.
*A47B 96/06* (2006.01)
(52) U.S. Cl. ............... 248/205.1; 248/300; 248/906
(58) Field of Classification Search ............ 248/205.1, 248/906, 300, 343, 222.12, 229.16, 229.26, 248/221.11, 222.11, 222.13; 174/58; 220/3.9
See application file for complete search history.

(56) References Cited

U.S. PATENT DOCUMENTS

| | | | |
|---|---|---|---|
| 1,850,616 A | 3/1932 | Bennett | |
| 2,143,278 A | 1/1939 | Myers | |
| 2,233,548 A | 3/1941 | Mroziak | |
| 2,712,917 A * | 7/1955 | Flora et al. ................. | 403/397 |
| 4,893,773 A * | 1/1990 | Fujimoto ................. | 248/311.2 |
| 5,004,199 A | 4/1991 | Suk | |
| 5,289,934 A | 3/1994 | Smith | |
| 5,364,051 A * | 11/1994 | Philpot ................... | 248/229.26 |
| 5,408,045 A | 4/1995 | Jorgensen | |
| 5,579,939 A | 12/1996 | Bourassa | |
| 5,676,486 A * | 10/1997 | Keith ......................... | 403/231 |
| 5,810,303 A * | 9/1998 | Bourassa et al. ......... | 248/205.1 |
| 5,841,068 A | 11/1998 | Umstead | |
| 5,931,425 A | 8/1999 | Oliva | |
| 6,207,897 B1 | 3/2001 | Reiker | |
| 6,209,836 B1 | 4/2001 | Swanson | |
| 6,491,270 B1 * | 12/2002 | Pfaller ...................... | 248/200.1 |
| 6,573,446 B1 | 6/2003 | Umstead | |
| 2003/0006353 A1 * | 1/2003 | Dinh et al. .................. | 248/343 |
| 2003/0024927 A1 | 2/2003 | MacDonald | |

FOREIGN PATENT DOCUMENTS

JP 5003617 1/1993

* cited by examiner

*Primary Examiner*—Ramon O Ramirez
(74) *Attorney, Agent, or Firm*—Marcus R. Mickney; Mark S. Bicks; Alfred N. Goodman

(57) ABSTRACT

An electrical box bracket has an adjustable member to facilitate securing the bracket to supports of varying sizes. The bracket has first and second legs that are connected by a third leg. A cut-out extends from the first leg onto the third leg. The adjustable member is formed by the cut-out to facilitate securing the bracket to the support. A centerline on the third leg of the bracket is adapted to be aligned with corresponding indicia on the support. The support indicia is visible through the cut-out to facilitate positioning the bracket on the support. A plurality of weld projections on the second leg facilitate securing a variety of different electrical boxes to the electrical box bracket.

37 Claims, 5 Drawing Sheets

ADJUSTABLE BRACKET FOR SECURING AN ELECTRICAL BOX TO A STUD

FIELD OF THE INVENTION

The present invention relates to an adjustable bracket for securing an electrical box to a support. More particularly, the present invention relates to a bracket having an adjustable member to secure an electrical box to studs of different sizes. Still more particularly, the present invention relates to a bracket having an adjustable member to secure an electrical box to either a metal or wood stud, the adjustable member being formed by a cut-out located in two different legs forming the bracket.

BACKGROUND OF THE INVENTION

Many different sized studs are used in home and building construction. Most brackets used to secure electrical boxes to studs are made for a specific size and stud type, such as metal or wood studs. Requiring so many different brackets requires installers to have a large inventory of brackets available for the numerous studs used in construction projects. If a specific bracket size is not available for a particular stud, an installer must order new brackets of the appropriate size or modify a different bracket that is available so that it will fit on the stud. This results in an inefficient and time consuming endeavor and further complicates the construction process. A need exists for a bracket that is easily adjustable to be secured to various size studs, thereby providing a more versatile bracket and reducing the number of different brackets required to be kept in inventory.

Another problem with existing electrical box brackets is not being able to correctly position the bracket on the stud. Existing electrical box brackets do not have openings that allow an installer to align the bracket with indicia marked on the stud to correctly position the bracket on the stud. This results in electrical boxes not being in proper positions when secured to the bracket. The brackets must then be remounted on the stud, thereby resulting in an inefficient and time consuming installation process. A need exists for an electrical box bracket in which marked indicia on the stud is visible through the bracket to facilitate proper positioning and mounting of the electrical box bracket on the stud.

Another problem with existing electrical box brackets is that there are insufficient weld projections on the brackets to ensure an adequate weld exists between the bracket and the electrical box, thereby compromising the integrity of the weld. This problem is further complicated by the numerous different electrical box brackets that are used in the construction process. Different electrical boxes have different knockout patterns, which often results in weld projections being located in a knockout so that it may not be used to create a weld joint between the electrical box and the bracket. A need exists for an electrical box bracket having a plurality of weld projections to ensure that a strong weld joint is formed between the bracket and the electrical box.

U.S. Pat. No. 6,573,446 to Umstead et al. discloses a bracket having an adjustable member, as shown in FIGS. 3, 7 and 8. However, the adjustable biasing portion 90 is formed by a portion of only the first leg member 82. Because the adjustable biasing portion is shorter than the length of the first leg member only a small range of support sizes can be accommodated by the bracket. Moreover, there is no opening on the base portion to allow an installer to align the bracket with indicia on the support.

Thus, there is a continuing need to provide improved brackets for securing electrical boxes to supports.

SUMMARY OF THE INVENTION

Accordingly, it is a primary objective of the present invention to provide an improved adjustable bracket.

Another objective of the present invention is to provide an improved adjustable bracket adapted to be securable to supports of various sizes, thereby reducing the number of different brackets in inventory.

A further objective of the present invention is to provide an improved bracket having an adjustable member to facilitate securing the bracket to supports of various sizes.

A further objective of the present invention is to provide a centerline on the bracket corresponding to marked indicia on the support to facilitate positioning the bracket on the support.

The foregoing objects are basically attained by providing an electrical box bracket for securing an electrical box to a support; the bracket having a first leg, a second leg, and a third leg connecting the first leg to the second leg; a cut-out extending from the first leg onto the third leg; and an adjustable member formed by the cut-out to facilitate securing the bracket to the support.

The foregoing objects are also basically attained by providing a method of securing an electrical box bracket to a support; securing the electrical box to the bracket; bending an adjustable member formed by the cut-out in the bracket to engage the support to which the bracket is being secured; aligning a centerline on the bracket with indicia on the support, the indicia being visible through a cut-out in the bracket; positioning the bracket on the support; and securing the bracket to the support.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings that form a part of the original disclosure.

DETAILED DESCRIPTION OF THE INVENTION

Figure 1:
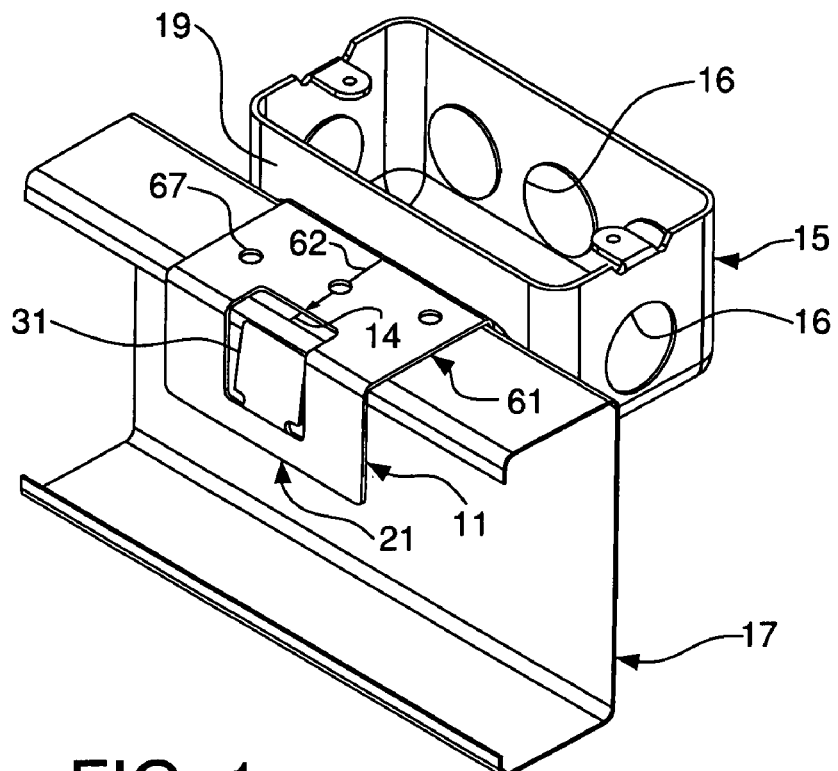
FIG. 1 is a perspective view of a bracket according to the present invention secured to a first support.

As shown in FIGS. 1–10, the present invention relates to an electrical box bracket 11 having an adjustable, or securing, member 31 to facilitate securing the bracket to supports of various sizes, such as a metal stud 17 or a wood stud 18. The electrical box bracket 11 has a first leg 21 and a second leg 41 that are substantially parallel. A third leg 61 connects the first leg 21 to the second leg 41. A cut-out 32 extends from the first leg 21 onto the third leg 61. The adjustable member 31 is formed by the cut-out 32 to facilitate securing the bracket 11 to the support. A centerline 62 on the third leg 61 of the bracket 11 is adapted to be aligned with corresponding indicia 14 on the support. The support indicia 14 is visible through the cut-out 32 to facilitate positioning the bracket 11 on the support. A plurality of weld projections 42 and 44 on the second leg 41 facilitate securing a variety of different electrical boxes 15 to the electrical box bracket 11.

Figure 6:
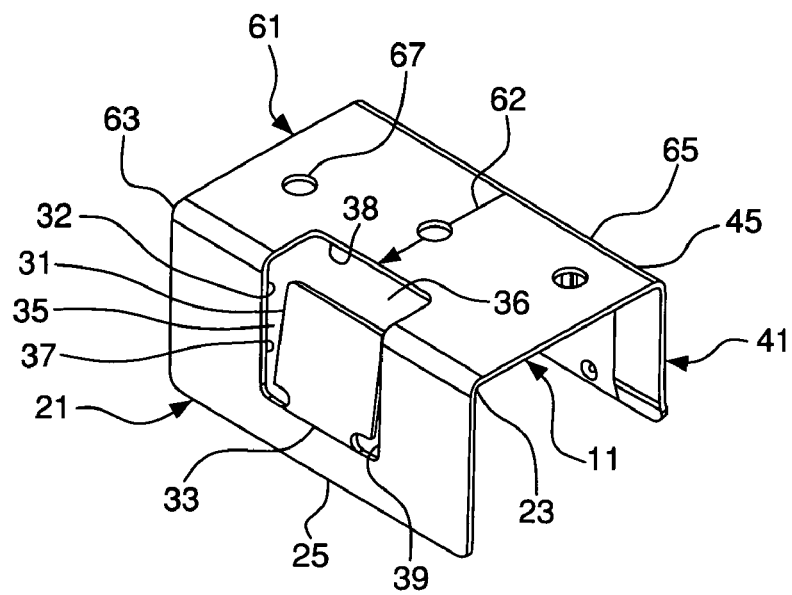
FIG. 6 is a perspective view of the bracket of FIG. 1.
Figures 7, 8:
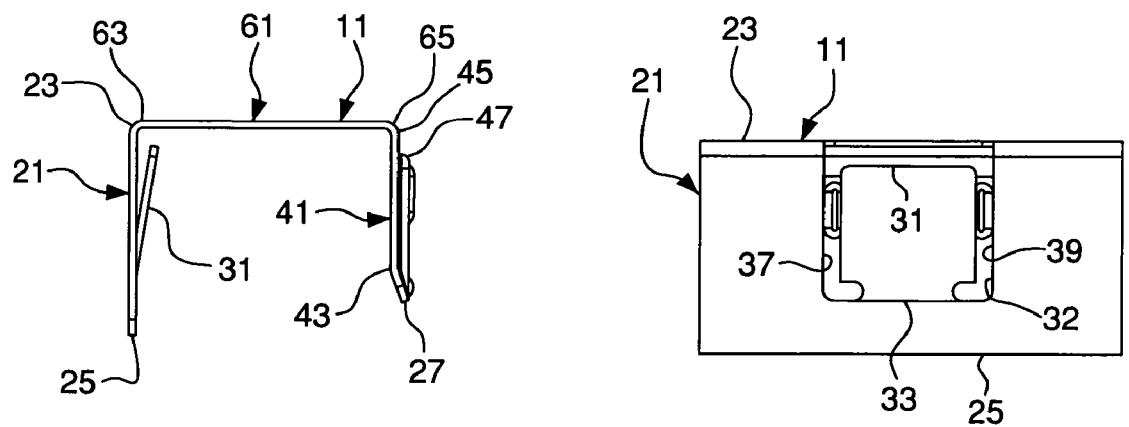
FIG. 7 is a side elevational view of the bracket of FIG. 6.
FIG. 8 is a front elevational view of the bracket of FIG. 6, showing the first leg of the bracket.
Figure 9:
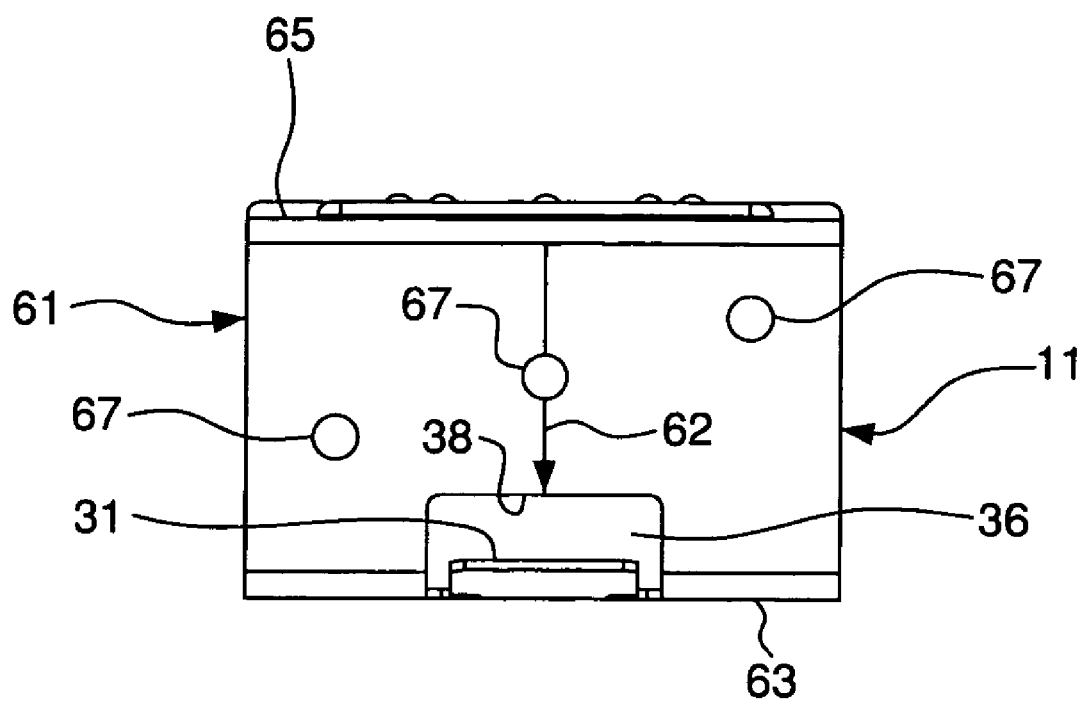
FIG. 9 is a top plan view of the bracket of FIG. 6, showing the third leg of the bracket.

The third leg 61 of the electrical box bracket 11 has a fifth end 63 and a sixth end 65, as shown in FIGS. 6, 7 and 9. The third leg 61 of the bracket 11 connects the first leg 21 and the second leg 41. Preferably, the third leg is substantially perpendicular to both the first leg 21 and the second leg 41. A plurality of fastener holes 67 in the third leg 61 receive fasteners to secure the electrical box bracket 11 to a support, such as a metal stud 17 or wood stud 18. The electrical box bracket 11 is shown secured to a metal stud 17 in FIG. 1 and a wood stud 18 in FIG. 2.

The first leg 21 of the electrical box bracket 11 extends from the third leg 61, as shown in FIGS. 6, 7 and 8. Preferably, a second end 25 of the first leg 21 is connected to the fifth end 63 of the third leg 61.

Figure 3:
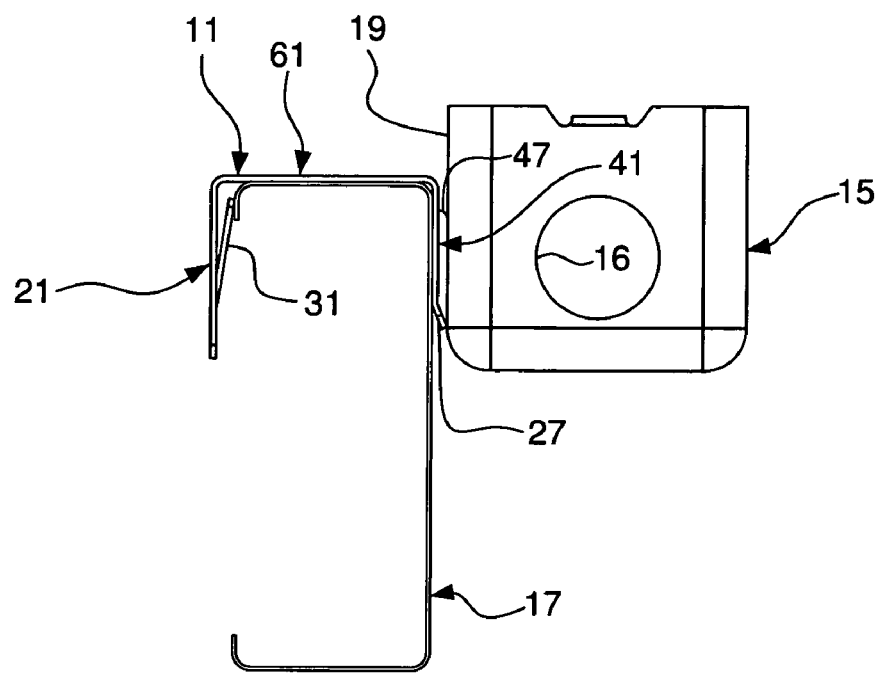
FIG. 3 is a side elevational view of the bracket secured to the support of FIG. 1.
Figure 4:
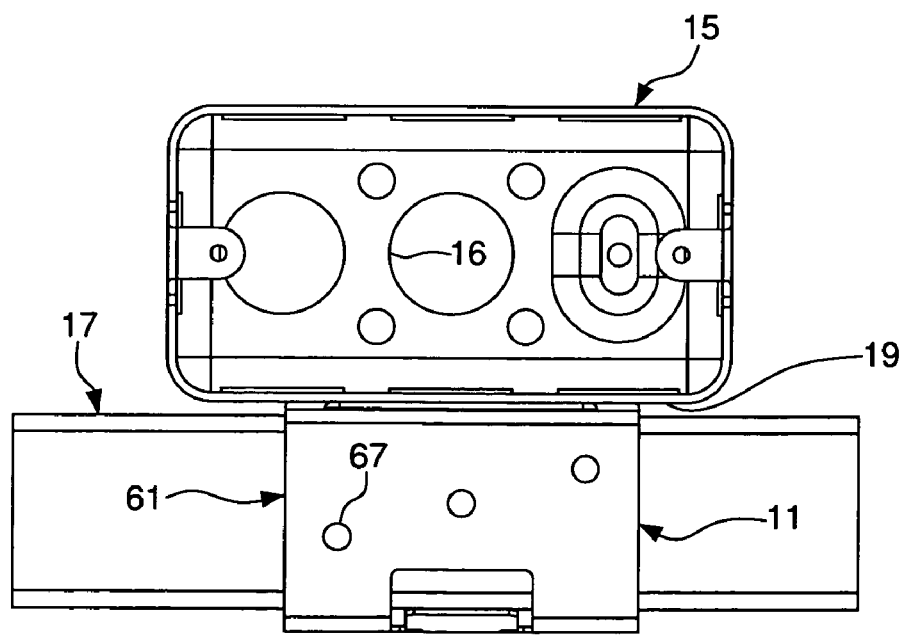
FIG. 4 is a top plan view of the bracket secured to the support of FIG. 1.
Figure 5:
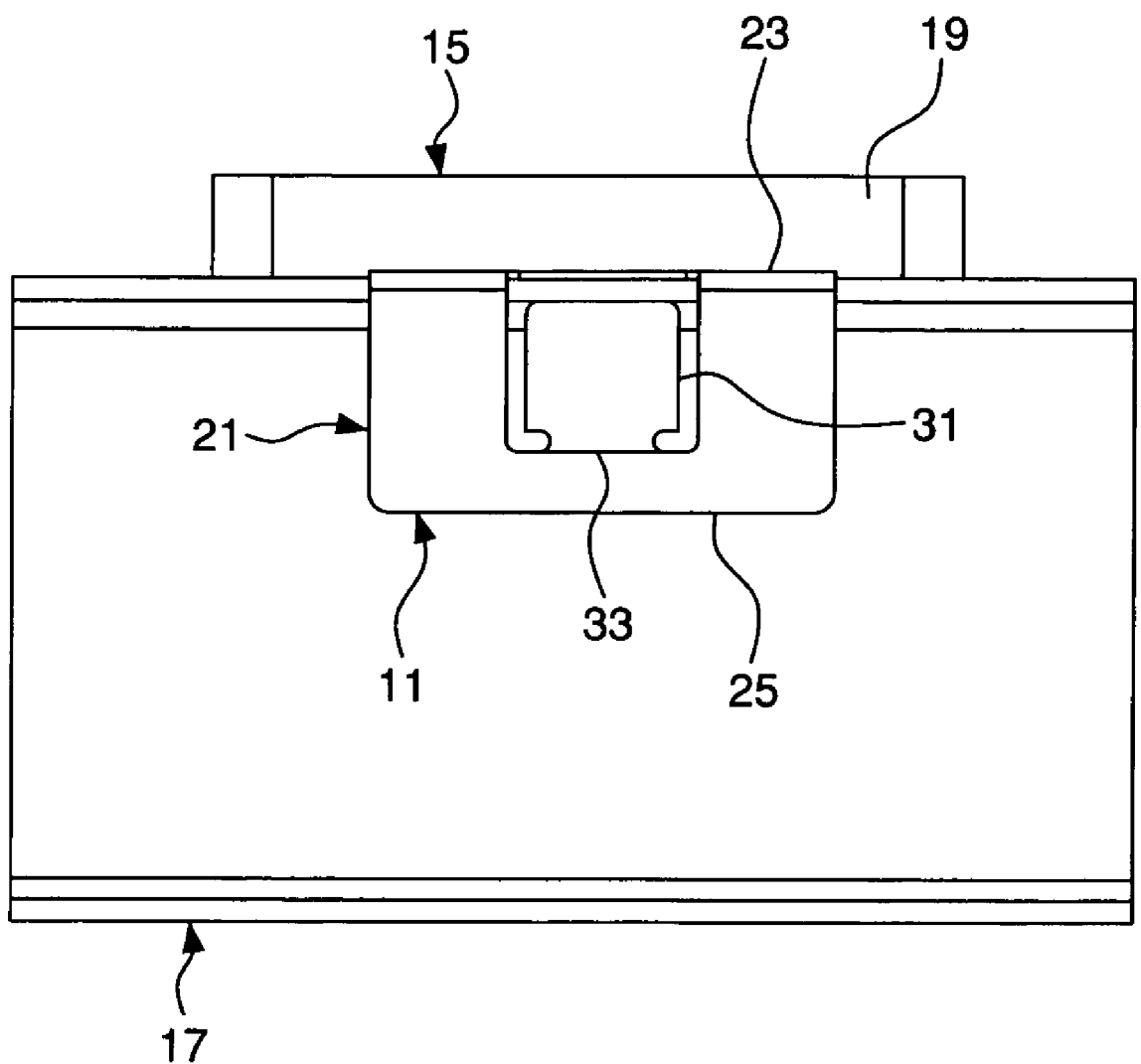
FIG. 5 is a front elevational view of the bracket secured to the support of FIG. 1.
Figure 10:
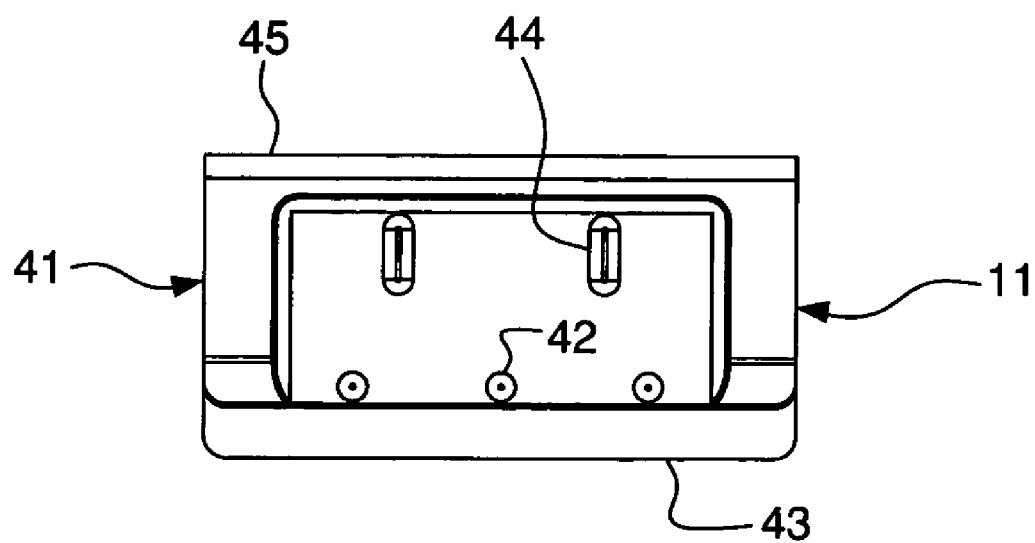
FIG. 10 is a rear elevational view of the bracket of FIG. 6, showing the second leg of the bracket.

The second leg 41 of the electrical box bracket 11 extends from the third leg 61, as shown in FIGS. 6, 7 and 10. Preferably, a fourth end 45 of the second leg 41 is connected to the sixth end 65 of the third leg 61. The second leg 41 terminates at the third end 43. Preferably, the second leg 41 is substantially parallel to the first leg 21. A step 47, as shown in FIGS. 3, 4 and 7, extends outwardly from the second leg 41 away from the first leg 21. The step 47 accommodates the overhang created by electrical box covers.

The second leg 41 of the bracket 11 has a bent distal portion 27 at the third end 43, as shown in FIGS. 3, 6, 7 and 10. Preferably, the bent distal portion 27 extends outwardly away from the second leg 41 at an angle of substantially 45 degrees. The bent portion 27 provides additional strength to the electrical box bracket 11.

A cut-out 32 is made in the bracket 11 that begins on the first leg 21 of the bracket and continues onto the third leg 61, as shown in FIG. 6. The cut-out 32 forms the adjustable member 31. Preferably, the cut-out 32 is substantially U-shaped, so that a substantially U-shaped adjustable member 31 is formed. A substantially U-shaped cut-out 32 has a first edge 37, a second edge 38 and a third edge 39. The first and third edges 37 and 39 of the cut-out 32 are substantially perpendicular to the first end 23 of the first leg 21. The second edge 38 of the cut-out is substantially perpendicular to the first and third edges 37 and 39, and is on the third leg 61 of the bracket connecting the first and third edges. The adjustable member 31 has an end 33 that is preferably on the first leg 21 of the bracket 11. The adjustable member 31 is pivotable about an end 33 to accommodate various sizes and types of studs. The adjustable member 31 may be any size up to the size of the cut-out 32. Preferably, the adjustable member 31 is integral with the first leg 21 and has a longitudinal length extending substantially to the first end 23 of the first leg 21. Alternatively, the adjustable, or securing, member 31 may be pivotally coupled to the first leg 21 having at least a portion of the adjustable member received in the cut-out 32. Alternatively, the cut-out may begin on the third leg 61 of the bracket 11 and extend onto the first leg 41, and the adjustable member 31 may be pivotally coupled to the third leg of the bracket.

A centerline 62 on the third leg 61 of the bracket 11, as shown in FIGS. 6 and 9, facilitates securing the bracket to the support. The centerline 62 is adjacent the second edge 38 of the cut-out 32. The portion 36 of the cut-out opening 35 in the third leg 61 of the bracket 11 allows an installer to see corresponding marked indicia 14 on the support. The installer may then align the centerline 61 on the bracket 11 with the support indicia 14 to properly position the bracket on the support.

A plurality of weld projections 42 and 44 on the second leg 41 of the electrical box bracket 11 ensure that an adequate weld connection is formed between the bracket and the electrical box 15. Due to the variety of electrical boxes that may be used in construction projects, a plurality of weld projections 42 and 44 ensure that not all of the weld projections fall in the box knockouts 16, thereby preventing them from being used to create a weld connection. The plurality of weld projections 42 and 44 on the second leg 41 of the bracket 11 ensure that a sufficient amount of weld projections 42 and 44 do not fall within electrical box knockouts 16, thereby allowing an adequate weld connection to be formed between the bracket 11 and the electrical box 15.

Preferably, the first, second and third legs 21, 41 and 61 of the electrical box bracket 11 are unitarily formed. Preferably, the electrical box bracket 11 is made of a metal, such as steel.

Assembly and Disassembly

Figure 2:
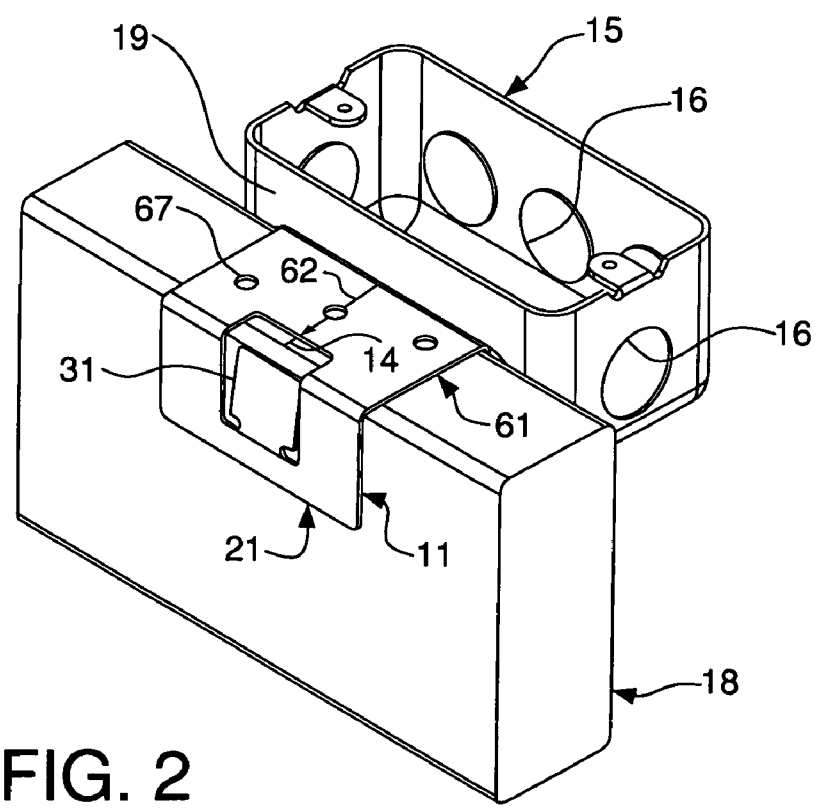
FIG. 2 is a perspective view of the bracket of FIG. 1 secured to a second support of a different size than the first support.

The electrical box bracket 11 of the present invention is shown secured to a metal stud 17 in FIGS. 1 and 3–5 and to a wood stud 18 in FIG. 2. The electrical box bracket is shown unattached in FIGS. 6–10. The adjustable, or securing, member 31 allows the electrical box bracket 11 to be secured to supports of various sizes, shapes and types, such as metal and wood studs.

An electrical box 15 is preferably secured to the bracket 11 before the bracket is positioned on the support. A side face 19 of the electrical box 15 is positioned adjacent the second leg 41 of the bracket 11. The second leg 41 may have a step 47 to provide clearance for an electrical box cover to be attached to the electrical box. A plurality of weld projections 42 and 44 on the second leg 41 of the bracket ensure that sufficient weld projection are located in areas not within knockouts 16 in the electrical box so that a strong weld connection is formed between the bracket 11 and the electrical box 15.

To secure the electrical box bracket 11 to a support, the bracket is positioned so that the third leg 61 of the bracket is adjacent a face of the support to which the bracket is to be secured. The centerline 62 on the bracket is aligned with indicia 14 marked on the support. The support indicia 14 is visible to an installer through the portion 36 of the cut-out opening 35 on the third leg 61 of the bracket 11. Once the centerline 62 is aligned with the support indicia 14, the bracket is properly positioned on the support.

The adjustable member 31 of the bracket is then bent to engage the support to which the bracket 11 is being secured. The adjustable member 31 is pivoted about the end 33 on the first leg 21 of the bracket so that the adjustable member frictionally engages the support. The bracket 11 is then pushed into position on the support, as shown in FIGS. 1 and 2.

Fasteners are then inserted through the fastener holes 67 in the third leg 61 to secure the bracket 11 to the support. Appropriate fasteners are used depending on the type of support to which the bracket is secured.

While advantageous embodiments have been chosen to illustrate the invention, it will be understood by those skilled in the art that various changes and modifications may be made therein without departing from the scope of the invention as defined in the appended claims.

What is claimed is:

1. A bracket for securing an electrical box to a support, comprising:
    a first leg;
    a second leg;
    a third leg connecting said first leg to said second leg and having at least one fastener hole to facilitate securing said bracket to the support, said first and second legs extending in substantially the same direction from said third leg;
    a cut-out extending from said first leg onto said third leg; and
    an adjustable member formed by said cut-out to facilitate securing said bracket to the support, said adjustable member having a fixed proximal end and a free distal end.

2. A bracket for securing an electrical box to a support according to claim 1, wherein
    said second leg is substantially parallel to said first leg.

3. A bracket for securing an electrical box to a support according to claim 1, wherein
    said cut-out is substantially U-shaped.

4. A bracket for securing an electrical box to a support according to claim 1, wherein
    said adjustable member has an end on said first leg of said bracket.

5. A bracket for securing an electrical box to a support according to claim 4, wherein
    said second leg of said bracket has a plurality of weld projections to facilitate securing the electrical box to said bracket.

6. A bracket for securing an electrical box to a support according to claim 1, wherein
    said second leg of said bracket has a bent distal end.

7. A bracket for securing an electrical box to a support according to claim 6, wherein
    said bent distal end of said second leg extends at an angle of substantially 45 degrees.

8. A bracket for securing an electrical box to a support according to claim 1, wherein
    said second leg of said bracket has a step to facilitate securing said bracket to the support.

9. A bracket for securing an electrical box to a support according to claim 1, wherein
    said third leg is substantially perpendicular to said first and second legs.

10. A bracket for securing an electrical box to a support according to claim 1, wherein
    said bracket is made of steel.

11. A bracket for securing an electrical box to a support according to claim 1, wherein
    a centerline is marked on said third leg of said bracket adjacent an end of said cut-out, said centerline being alignable with corresponding indicia on the support visible through said cut-out.

12. A bracket for securing an electrical box to a support according to claim 11, wherein
    said centerline is stamped in said third leg of said bracket.

13. A bracket for securing an electrical box to a support, comprising:
    a first leg having first and second ends;
    a second leg having third and fourth ends, said second leg being substantially parallel to said first leg;
    a third leg having fifth and sixth ends, said fifth end of said third leg being connected to said second end of said first leg and said sixth end of said third leg being connected to said fourth end of said second leg;
    a cut-out extending from said first leg onto said third leg;
    an adjustable member formed by said cut-out to facilitate securing said bracket to the support; and
    a bent distal end extending outwardly at said third end of said second leg.

14. A bracket for securing an electrical box to a support according to claim 13, wherein
    said third leg is substantially perpendicular to said first and second legs.

15. A bracket for securing an electrical box to a support according to claim 13, wherein
    said bent distal end extends at an angle of substantially 45 degrees from the second leg.

16. A bracket for securing an electrical box to a support according to claim 13, wherein
    said cut-out is substantially U-shaped.

17. A bracket for securing an electrical box to a support according to claim 13, wherein
    said adjustable member has an end on said first leg of said bracket.

18. A bracket for securing an electrical box to a support according to claim 13, wherein
    said second leg of said bracket has a plurality of weld projections to facilitate securing the electrical box to said bracket.

19. A bracket for securing an electrical box to a support according to claim 13, wherein
    said second leg of said bracket has a step to facilitate securing said bracket to the support.

20. A bracket for securing an electrical box to a support according to claim 13, wherein
    said bracket is made of steel.

21. A bracket for securing an electrical box to a support according to claim 13, wherein
    said third leg of said bracket has at least one fastener hole to facilitate securing said bracket to the support.

22. A bracket for securing an electrical box to a support according to claim 13, wherein
    a centerline is marked on said third leg of said bracket adjacent an end of said cut-out, said centerline being alignable with corresponding indicia on the support visible through said cut-out.

23. A bracket for securing an electrical box to a support according to claim 22, wherein
    said centerline is stamped in said third leg of said bracket.

24. A bracket for securing an electrical box to a support, comprising:
    a first leg having first and second ends;
    a second leg having third and fourth ends, said second leg being substantially parallel to said first leg;
    a third leg having fifth and sixth ends, said fifth end of said third leg being connected to said second end of said first leg and said sixth end of said third leg being connected to said fourth end of said second leg, said third leg being substantially perpendicular to said first and second legs;

a substantially U-shaped cut-out extending from a fixed end on said first leg onto said third leg;

an adjustable member formed by said cut-out to facilitate securing said bracket to the support;

a bent distal end extending outwardly at said third end of said second leg;

a plurality of weld projections on said second leg to facilitate attaching said bracket to the electrical box; and at least one fastener hole on said third leg to facilitate securing said bracket to the support.

25. A bracket for securing an electrical box to a support according to claim 24, wherein
said second leg of said bracket has a step to facilitate securing said bracket to the support.

26. A bracket for securing an electrical box to a support according to claim 24, wherein
said bracket is made of steel.

27. A bracket for securing an electrical box to a support according to claim 24, wherein
said bent distal end extends at an angle of substantially 45 degrees from said second leg.

28. A bracket for securing an electrical box to a support according to claim 24, wherein
a centerline is marked on said third leg of said bracket adjacent an end of said cut-out, said centerline being alignable with corresponding indicia on the support visible through said cut-out.

29. A bracket for securing an electrical box to a support according to claim 28, wherein
said centerline is stamped in said third leg of said bracket.

30. A method of securing a bracket to a support, comprising the steps of securing an electrical box to the bracket,
bending an adjustable member formed by the cut-out in the bracket to engage the support to which the bracket is being secured,
aligning a centerline on the bracket with indicia on the support, the indicia being visible through a cut-out in the bracket,
positioning the bracket on the support, and
securing the bracket to the support.

31. A method of securing a bracket to a support according to claim 30, wherein
the step of securing the bracket to the support comprises inserting fasteners through fastener holes in the bracket and into the support.

32. A method of securing a bracket to a support according to claim 30, wherein
the step of securing the electrical box to the bracket comprises welding weld projections on the bracket to the electrical box.

33. A bracket for securing an electrical box to a support, comprising:
a first leg;
a second leg having a plurality of weld projections to facilitate securing the electrical box to said bracket;
a third leg connecting said first leg to said second leg, said first and second legs extending in substantially the same direction from said third leg;
a cut-out extending from said first leg onto said third leg; and
an adjustable member formed by said cut-out to facilitate securing said bracket to the support, said adjustable member having a fixed proximal end and a free distal end, said fixed end being connected to said first leg.

34. A bracket for securing an electrical box to a support according to claim 33, wherein
said second leg is substantially parallel to said first leg.

35. A bracket for securing an electrical box to a support according to claim 33, wherein
said cut-out is substantially U-shaped.

36. A bracket for securing an electrical box to a support according to claim 33, wherein
said second leg of said bracket has a step to facilitate securing said bracket to the support.

37. A bracket for securing an electrical box to a support according to claim 33, wherein
said third leg of said bracket has at least one fastener hole to facilitate securing said bracket to the support.

* * * * *